United States Patent Office 2,963,575
Patented Dec. 6, 1960

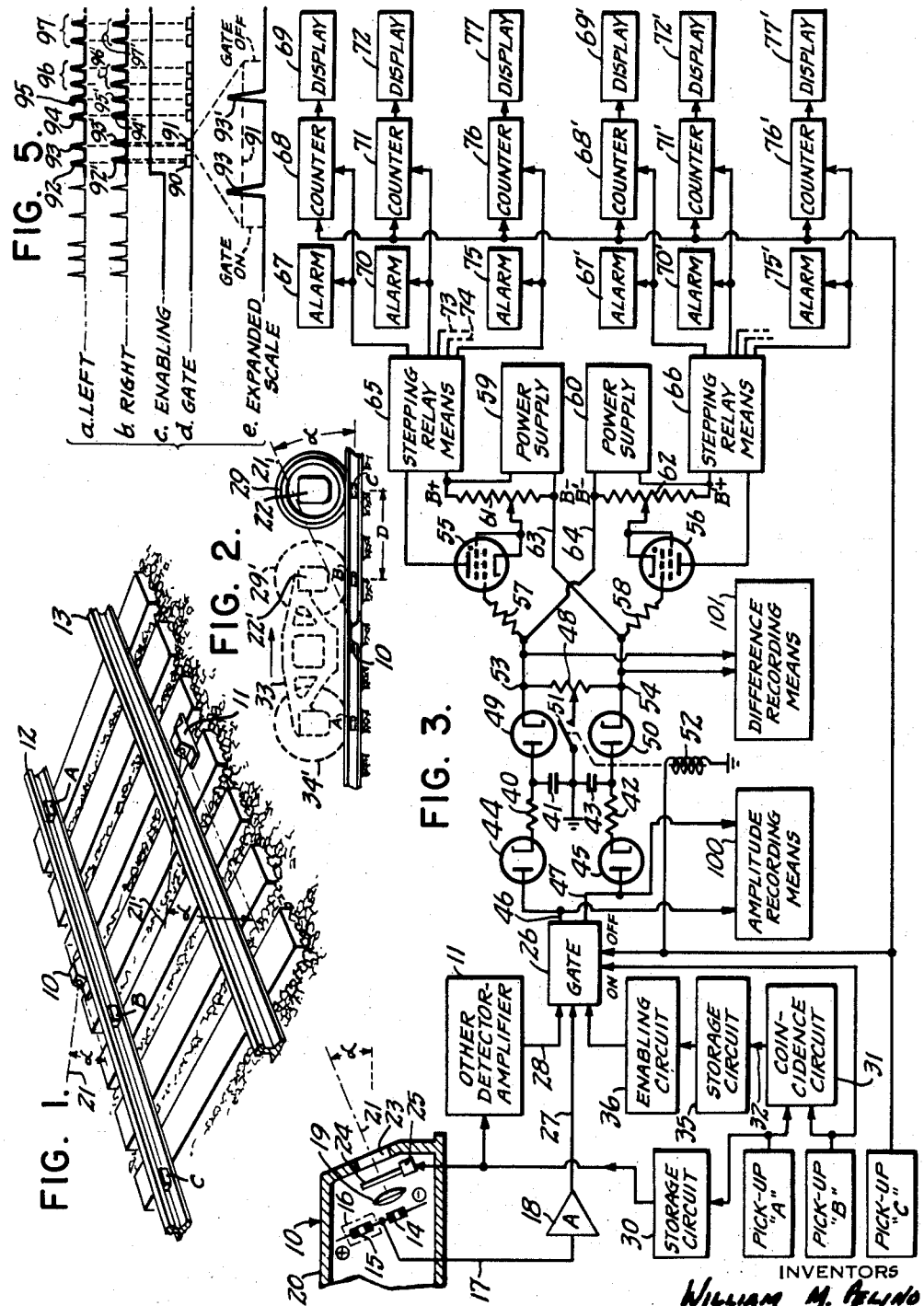

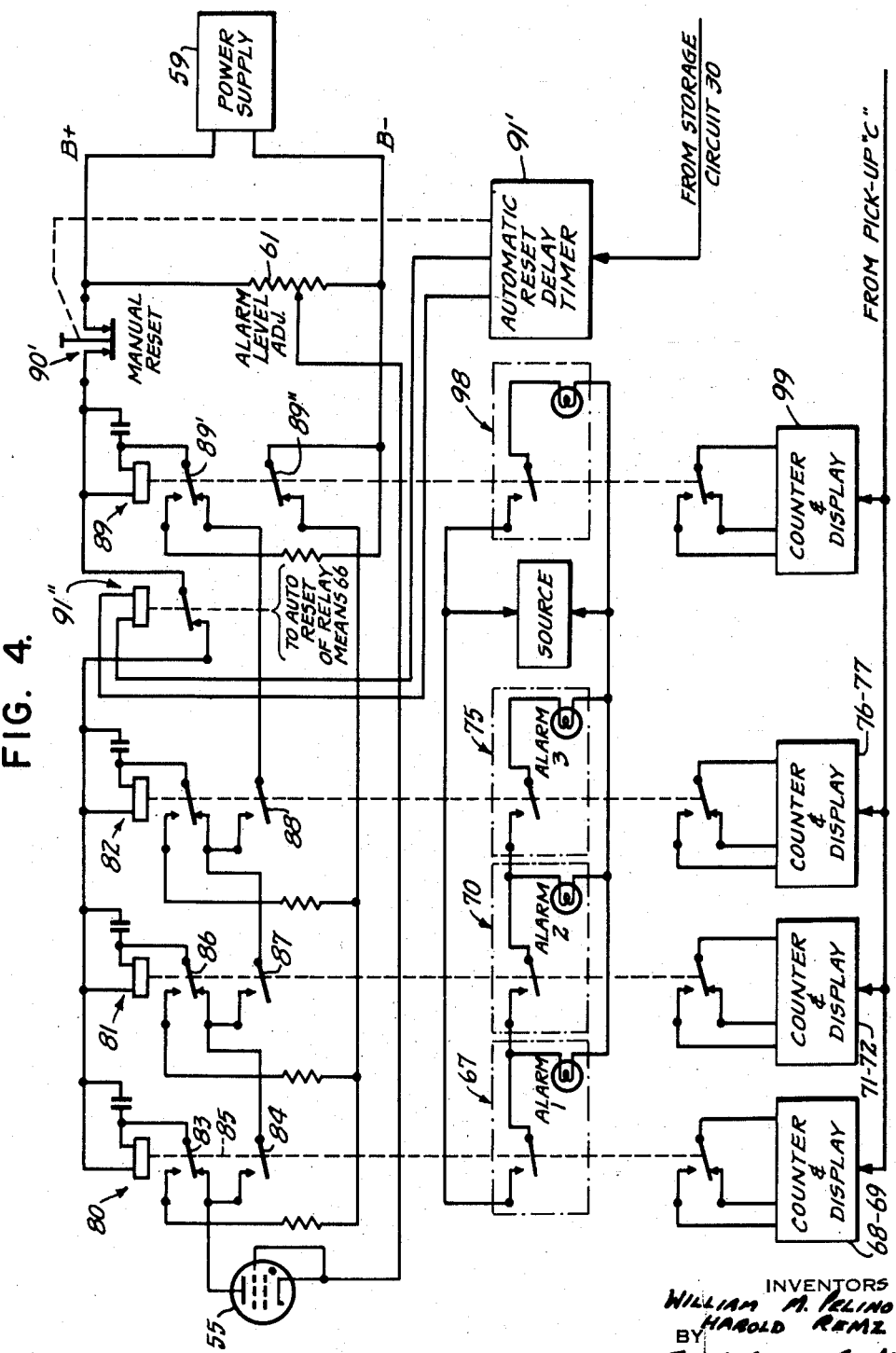

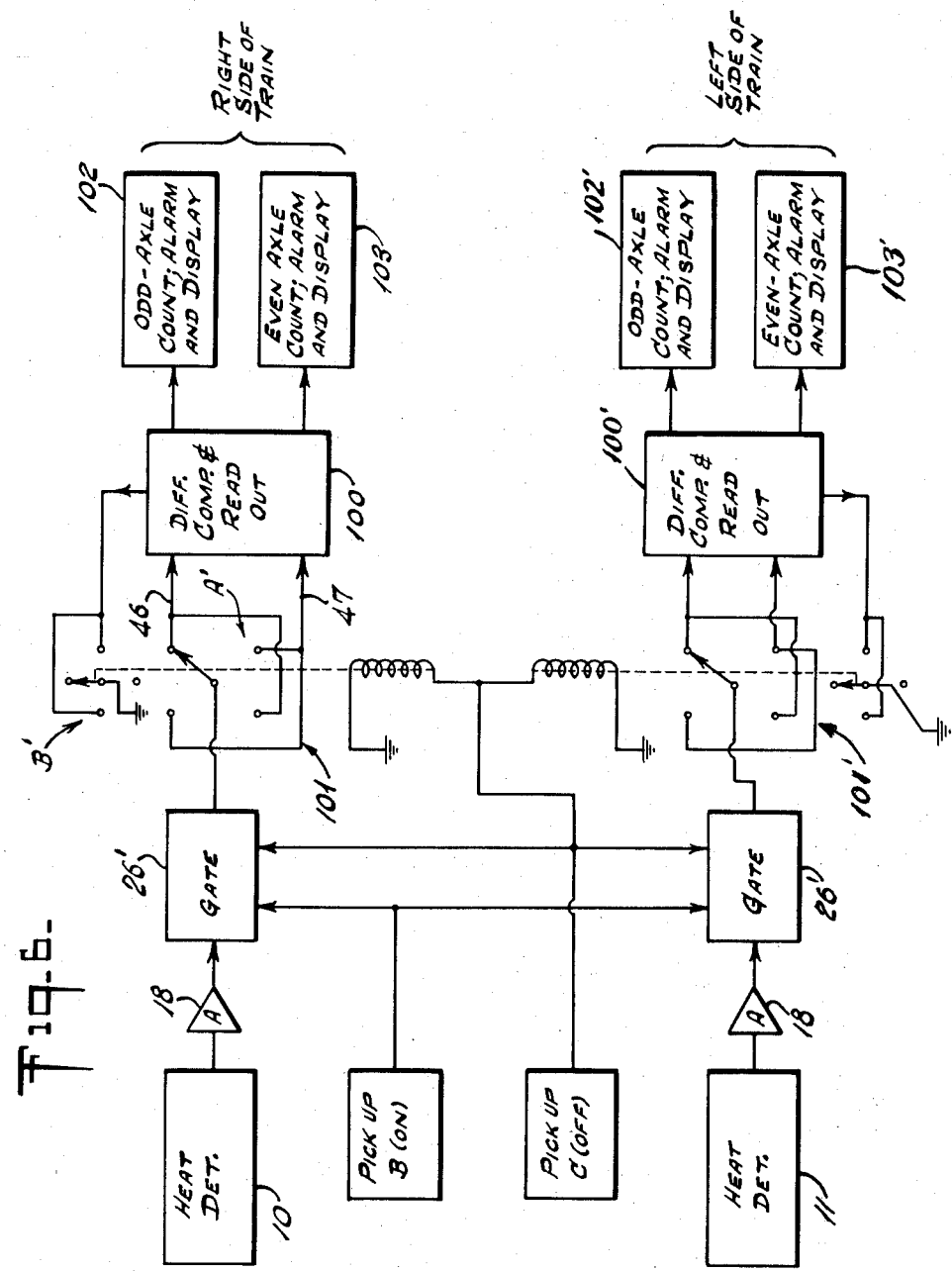

2,963,575

HOT BOX DETECTOR ALARM CIRCUIT

William M. Pelino, Garden City, and Harold Remz, Westbury, N.Y., assignors to Servo Corporation of America, New Hyde Park, N.Y., a corporation of New York Filed May 26, 1959, Ser. No. 815,951

22 Claims. (Cl. 246—169)

Our invention relates to an improved hot-box detector of the variety which is mounted alongside a railway track, and which automatically remotely responds to yield an indication or warning of the passage of an overheated journal box. This application incorporates improvements over co-pending application Serial No. 620,703, filed November 6, 1956, now abandoned, in the names of Cornelius A. Gallagher and William M. Pelino, and is a continuation-in-part of our application Serial No. 695,352, filed November 8, 1957, now abandoned.

In hot-box detectors as previously disclosed, heat-responsive cells have been placed on opposite sides of the track, and they have been used to separately evaluate the thermal conditions of passing journal boxes at the opposite ends of rolling-stock axles. These detectors have usually been connected to graphical recording means so that an operator may interpret the record to determine whether an excessively hot journal box has been observed. Unfortunately, this type of observation requires that the operator possess some skill in noting whether the journals are of the so-called plain-bearing or roller-bearing type, it being noted that roller bearings consistently run at higher temperatures than plain bearings. Thus, to an unskilled operator, roller bearings can give false indications of excessively hot journal conditions. As long as an operator must use his intelligence to determine whether a given apparently excessive signal is due to a bad plain bearing or to a normal roller-bearing or to a bad roller-bearing, it is virtually impossible to employ ordinary threshold techniques for having such devices operate automatic alarms.

It is, accordingly, an object of the invention to provide an improved hot-box detector construction not subject to the above-noted limitations.

It is another object to provide an improved hot-box detector construction in which a reliable alarm may be provided for the circumstance of a detected journal box of excessive temperature, more or less regardless of the speed of a passing train, and regardless of the type of bearing (namely, roller or plain bearing) involved.

It is a specific object to provide an automatic alarm system of the character indicated in which the system will automatically discriminate against undesired rolling stock, as, for example, locomotives and passenger cars, so that in such case the alarm will be set off only for excessively warm freight-car journals.

It is another specific object to meet the above objects with a device which may not only automatically yield an alarm for each hot-box detected on a given train, but which may also identify the particular end of the particular axle giving rise to the trouble, so that the faulty journal box may be immediately located and the troublesome car set out, with minimum down-time, thus reducing delays in train schedules.

Other objects and various further features of novelty and invention will be pointed out or will occur to those skilled in the art from a reading of the following specification in conjunction with the accompanying drawings. In said drawings, which, show, for illustrative purposes only, preferred forms of the invention:

Fig. 1 is a fragmentary view in perspective illustrating the invention and showing a section of track to which our detector has been applied;

Fig. 2 is a side view or axial-end elevation of the track of Fig. 1 and showing in solid and phantom outline various wheel locations for passing rolling stock, in relation to the geometry of the layout of the detector system;

Fig. 3 is a diagram schematically depicting optical and electrical parts of the detector and associated circuitry employed in the arrangements of Figs. 1 and 2;

Fig. 4 is an electrical circuit diagram illustrating in more detail certain parts of Fig. 3;

Fig. 5 is a graphical diagram depicting the timing of electrical signals involved in a typical operation of the device of Figs. 1 to 4; and Fig. 6 is a block diagram of an alternative embodiment of Fig. 3.

Briefly stated, our invention contemplates an improved hot-box detector of the variety in which a heat-responsive cell or element is fixedly mounted alongside a section of track to be monitored. Duplicate heat-responsive cells are actually mounted on both sides of the track so that, at any one longitudinal location along the track, the opposite ends of the axles of passing rolling stock can be simultaneously monitored. Optics continuously image the cell at each end of the axle in the plane of the passing journal boxes, and novel gating means are employed whereby not only may there be assurance that the cells "look at" only journal boxes, but there may also be the further assurance that these journal boxes will not be on locomotives or passenger cars. The invention is characterized by means for differentially evaluating the outputs of the heat responsive means, for pairs of passing railroad journal boxes or axles, and operating an alarm circuit upon detecting a difference exceeding a given level.

Our invention features automatic alarm systems whereby a separate alarm is sounded for each hot-box detected on a passing train; the alarm may include an indicator clearly displaying not only the side of the train on which the fault arises, but also the axle location on the train. Provision is made for automatic indication of plural hot-box conditions on a given train, so that the need for checking the whole train is completely avoided and the faulty car or cars may be quickly set out so as to reduce to an absolute minimum any possible loss of scheduled train time.

Referring to the drawings, our invention is shown in application to plural detector units 10—11 fixedly mounted alongside the right of way and on opposite sides of a given section of longitudinally extending track, comprising rails 12—13. The detector units 10—11 may be exact duplicates of each other, and therefore in Fig. 3 the important parts of the detector 10 are shown in greater detail, whereas those within the detector 11 are merely schematically indicated by a block designation. Each of the detector units may include an active heat-responsive cell 14, such as a so-called thermistor flake, shown connected in a bridge circuit employing a second or compensator cell 15, shielded by means 16 from incident radiation and therefore responsive only to ambient temperature.

As indicated, the cells 14—15 are placed in a bridge circuit the arms of which are shown oppositely polarized, as by application of positive biasing voltage to the outer terminal of cell 15 and negative biasing voltage to the outer terminal of the cell element 14. Bridge output is available in line 17 to pre-amplifier means 18, which may be contained within the housing of the detector unit 10. As indicated, similar components are provided at detector and amplifier means 11.

At detector unit 10, infrared-transmitting optics, such as the lens 19, is so mounted within the detector housing 20 as to image the active cell 14 on a generally upwardly inclined axis 21 (having an elevation angle α), and preferably focused at the horizontal plane of passing journal boxes, such as the box 22 (Fig. 2) for freight-car rolling stock; detector 11 has a similarly inclined response axis 21'. A full discussion of orientation in the manner indicated for the axis 21 in reference to journal boxes, as at 22, is contained in said co-pending application so that further detail on that subject is not presented herein. The imaging axis 21 is shown to pass through a localized opening 23 in the housing 20, and shutter means 24 between the lens 19 and the housing opening 23 provides mechanical protection for the lens element and other internal parts of the system, as long as no trains are passing. The shutter 24 is merely schematically designated in Fig. 3 and may comprise a simple blade, actuated by solenoid means 25, as will be understood.

As indicated generally above, our invention relies importantly on the operation of a gating means 26 accommodating the separate outputs 27—28 of the respective detectors 10—11 and assuring that said detectors effectively look only at journal boxes, that is, to the exclusion of all other matter passing the field of view of the respective detector-response axes. To operate the gate, we rely on electromagnetic wheel trips which may be and preferably are of the variety disclosed in copending Gallagher et al. application, Ser. No. 627,330, now abandoned, filed December 10, 1956, wherein a polarized magnetic air gap is established in the path of oncoming wheel flanges so that the passage of each wheel flange automatically develops a suitably characterized pulse, clearly identifying the instant at which each wheel center passes a particular point along the track.

The wheel-trip location is so related to the placement of the detectors 10—11 and their respective response axes 20—21' that gating occurs only when the axes 20—21' are imaged on opposed journal boxes for the same axle. In the form shown, two such wheel trips (labeled B and C in Figs. 1, 2 and 3) are employed, the effective spacing D between said trips being determined in the manner specified in greater detail in said Gallagher-Pelino application, whereby at the instant for which the phantom outline 29' for a particular truck wheel 29 is symmetrically positioned over the trip B, the optical alignment 21 of the detector 10 is barely tangential to the bottom of the detector box 22 identified at 22'. An instant later, the wheel 29 and box 22 have moved to the position shown in solid outline in Fig. 2, at which time the wheel center is symmetrically positioned with respect to the trip C, and at this time the response axis 21 is just grazing the top corner of the journal box 22. Thus, the gated interval determined by pulses from pick-ups B and C may be employed first to "turn on" and then to "turn off" the gating function at 26, determining response only to heat radiated by the journal box 22, regardless of the speed of the passing wheel 29. Ordinarily, for a viewing axis 21 or 21' having an elevation of the order of 25° above the horizontal, and for observation of conventional freight-car journals 22, the preferred effective spacing D between the pickups B and C is of the order of 40 inches.

As also explained in said copending Gallagher-Pelino application, the shutter means (24) is actuated to expose the optics on the alignments 21—21' as long as any train is passing the installation. For this purpose, we show the employment of an additional wheel trip identified at A in the drawings. The pick-up or trip A may be of the same nature as employed at B and C, and for the situation depicted in Fig. 2 (wherein the aspect of viewing on the passing rolling stock is for a train going away from the detector; in other words, trailing-aspect viewing), the pick-up A is preferably spaced ahead of the pick-ups B and C, as shown. Output pulses from the pick-up A are shown to be passed to a relatively long-time-constant storage circuit 30, the output of which will be a voltage sufficient to hold open the shutters 24 of the respective detectors 10—11 as long as pulses are generated by the pick-up A, and even for the slowest speed trains, down to, say, five miles an hour.

As indicated generally above, our detector system automatically discriminates against locomotives, passenger cars and other railroad rolling stock which is not of standard freight-car wheelbase dimensions. Freight car truck wheelbases are standardized at five and one-half feet, and in one aspect our invention makes use of the fact that this wheelbase is not encountered in any other type of rolling stock, including locomotives and passenger cars.

Discriminating devices of this general character are disclosed in greater detail in copending application Serial No. 758,200, filed September 2, 1958, but for present purposes, it suffices to explain that in Fig. 3 the outputs of both pick-ups A and B are fed to a coincidence circuit 31 effective to pass in the output line 32 a wheel-trip pulse only when the two wheels of a given truck 33 simultaneously actuate the trips or pick-ups A and B. In Fig. 2, this condition is illustrated in lightly dashed outline, the wheels being identified at 29'—34' for the truck 33, and it will be seen that the preferred spacing, of course, for the trips A—B is the aforesaid wheelbase to be selected, namely, five and one-half feet, being the wheelbase for trucks of standard American freight-car rolling stock.

Coincidence pulses derived in line 32 are shown fed to a storage circuit 35 which is again of the long time-constant variety, as disclosed at 30, and serves to operate enabling means such as a relay 36 for conditioning the gate 26 for opeartion. In other words, the function of the pick-ups A and B in combination with the circuits 31—35—36 is to prevent operation of the gate 26 until such time as the first freight-car truck is encountered, and yet to maintain the gate suitably conditioned (once it has been enabled) for the full passage of the freight cars in the train, even for slow trains. This means, of course, that for the usual situation in which a locomotive is pulling a train, no locomotive trucks or wheel arrangements will be effective to enable the gate 26, inasmuch as the standard freight-car wheelbase occurs only for freight-cars and not for locomotives; it may also be observed that the standard freight-car wheelbase (5½ feet) is not encountered in passenger rolling stock, so that here too, the gate 26 is not enabled (and, therefore, cannot be opened) for any given train until such time as the first freight-car truck is detected by the coincidence circuit 31.

It so happens that for the particular wheel trip which we have employed in our work to date, the identifying pulse marking the instant of passage of a wheel center past a given location on a track is relatively short compared to the time within which the whole journal box 22 is viewable, namely, the time taken for a train to pass the distance D between pick-ups B and C. Also, it so happens that, because of axial and other play in the mounting of axles, wheels and trucks, a given freight-car axle will not at all times necessarily be perfectly aligned perpendicular to the gage line of the track. This means that a heat detection pulse derived upon exposure for the detector 10 along the axis 21 may be slightly differently timed (or out of phase) with respect to the corresponding pulse derived for exposure along the axis 21'. Thus, any difference evaluation of slightly de-phased pulses of this character could result in failure to obtain a true differential evaluation.

In accordance with a feature of the invention, we avoid any such phase error due to misalignment of the axle with respect to the track. For this purpose, we employ the gated interval as the period during which any heat signals developed by detectors 10—11 will be stored or integrated. Thus, if the heat signal for one detector 10 is developed relatively early in the gated interval, compared to the time of development of the heat signal for the other detector 11, the function and effect of the storage means will be to present stored signals of magnitudes reflecting the observed heat signal, but without any phase displacement; thus, a simultaneous read-out of the stored information may result in true differential evaluation.

In the form shown in Fig. 3, such storage means comprises two resistance-capacitance networks 40—41 and 42—43 charged by diodes 44—45 connected respectively to two outputs of the gate 26, the output 46 presenting gated signals of intelligence developed only by the cell 14 within the detector 10, and the output 47 similarly presenting gated signals originating at the detector 11. The time constant for charging the capacitors 41—43 is relatively short, that is, in the forward direction for the diodes 44—45. In the reverse direction, of course, the diodes 44—45 block, and therefore the charge is held on each of the capacitors 41—43 until discharge upon read-out.

In the form shown, the read-out circuit includes a potentiometer or voltage-dividing resistor 48 connected by diodes 49—50 to the positively charged terminals of the storage devices (capacitors) 41—43, respectively; the voltage divider 48 is shown to have an adjusted midpoint, whereby the circuit may be initially balanced to take into account any slight variations in circuit constants, as will be understood. No voltage will be developed across the resistor 48 until such time as a circuit is closed from the mid-point thereof to the junction (grounded) between the capacitors 41—43; to close this connection, we show relay contacts 51 actuated by a coil 52. It will be seen that, once the circuit to ground is closed through contact 51, any voltages on the respective capacitors 41—43 will be discharged through the respective diodes 49—50 and through the divided halves of the voltage divider 48.

The coil 52 for relay contacts 51 is shown connected for transient operation by pick-up C; thus, once the wheel 29 has traversed the distance D between pick-ups B and C, (and, therefore, once the gating or integrating interval has been concluded), the integrated charges at 41—43 will be differentially evaluated, upon transient closure of relay 51 at the instant at which the wheel 29 is shown in solid outline in Fig. 2. At this instant, the respective voltages at 41—43 are discharged to develop, across the divided halves of potentiometer 48, voltages proportional to the separate resulting currents.

If journal-box conditions are normal, the heat observed on the axis 21 will be substantially the same as that observed on the axis 21', and the charges at 41—43 will be essentially the same, in which event the voltages developed across the divided halves of potentiometer 48 will be essentially the same. This is true whether plain bearings (assuming, as is completely realistic in practice, that plain bearings exist on opposite ends of any given axle) or roller bearings (assuming, again realistically, that roller bearings are on opposite ends of any given axle) are being observed at any given time. Thus, even if the heat happens to be high, meaning that a normal roller bearing is observed on the axis 21, the heat observed on the axis 21' will be similarly high because the bearing at the opposite end of the same axle will also be a roller bearing. Of course, if one of such roller bearings is defective, the heat observed on one of the axes 21—21' will be substantially above that observed at the same time on the other such axis. If the heat, for example, as observed on the axis 21 exceeds that observed on the axis 21', regardless of whether the bearings are of the plain or roller types, the voltage developed from the midpoint of potentiometer 48 to the terminal 53 will exceed the voltage developed from the midpoint of potentiometer 48 to the terminal 54; in like manner, the reverse situation will be obtained for heat observed on axis 21' exceeding that observed on axis 21.

In accordance with the invention, we provide novel means utilizing this difference to sound an alarm, should the difference exceed a given preselected threshold. In the form shown, cross-connected thyratrons 55—56 are the means whereby threshold is detected for any given polarity of detected difference between simultaneous heat-signal voltages. The control grid of the thyratron 55 is shown connected through an isolating resistor 57 to the terminal 53 of potentiometer 48, and in similar manner the control grid of the thyratron 56 is connected through an isolating resistor 58 to the terminal 54 of the same potentiometer 48. Each of the thyratrons 55 is operated from a separate power supply 59—60 so as to avoid interference between the two functions served by the two thyratrons 55—56. The power-supply voltage is shown applied across a voltage divider 61 for thyratron 55 and 62 for thyratron 56; in each case, the thyratron cathode is connected at a point having a potential higher than the lowest available from the power supply. For the case of power supply 59, said lowest potential is connected via line 63 to the terminal 54 of potentiometer 48, thus establishing what may be called a cross-connection, in reference to the corresponding line 64 connecting power supply 60 to the terminal 53 of potentiometer 48.

It will be noted that since the read-out circuit 48—51 is normally open, meaning that no current is flowing in the potentiometer 48, the B-minus potentials (designated B-minus for line 63 and B'-minus for line 64) are applied continuously to the grids of the respective cross-connected thyratrons 55—56, thus biasing and cutting the same off; furthermore, the adjustments at the cathode connections reflect the thresholds which must be exceeded upon differential read-out if one or the other of the thyratrons 55—56 is to be caused to conduct. Thus, if the heat signal developed by observation on axis 21 sufficiently exceeds the heat signal developed by observation on axis 21', the voltage or charge on capacitor 41 will substantially exceed that on capacitor 43, and upon read-out, the positive potential developed at terminal 53 will substantially exceed that developed at terminal 54, thus causing the grid of thyratron 55 (to the exclusion of the grid of thyratron 56) to become positive with respect to its cathode; thyratron 55 will in such case fire to the exclusion of thyratron 56.

In the arrangement shown, B-plus connections to the respective thyratrons are applied by stepping-relay means 65—66 in the plate circuits of the respective thyratrons. Upon the conduction, say, of the thyratron 55 in response to a hypothetical suitably polarized excessive difference voltage at 53 with respect to that at 54, an output pulse will be developed in the output circuit of thyratron 55. Said output pulse is effective simultaneously to advance the stepping relay means 65 and to actuate alarm and counter circuits 67—68.

The alarm circuit 67 may include a hold-in relay to sound a bell or illuminate a lamp, and the counter 68 may be enabled by the output pulse from thyratron 55 so as to start a counting operation, successive counts being advanced for each subsequent output pulse from the pick-up C. This means that the counter 68, once actuated, will count all axles, beginning with the troublesome axle and continuing to end of the train, so that the final count registered at the display 69 will provide a direct indication of the location of the troublesome axle on the train. Furthermore, it will be noted that since the thyratron 55 responds only to excessive heat conditions on the side of the track on which the axis 21 is oriented, the display at 69 will be specific for trouble on that side of the track. In a similar manner, for heat signals which are excessive alongside rail 13, namely, those observed on the axis 21', an alarm 67', counter 68' and display 69' will be called into play.

It will be understood that the stepping-relay means 65 or 66 is effective (once the first alarm circuit and counter mechanisms 67—68—69 have been actuated) to immediately shift connections to a second corresponding alarm and counter circuit 70—71—72 in readiness for possible development of another hot box on the same side of the train. The dashed lines 73—74 will be understood to suggest that the stepping relay means may include as many similarly indexed output connections to alarm and counter mechanisms as are deemed necessary to monitor the worst train conditions to be encountered, and we designate at 75—76—77 the alarm and counter display mechanisms associated with the last such alarm, counter and display mechanism for any one side of the train. Corresponding alarm and counter displays for the other side of the train, namely alongside rail 13, are identified by the same reference numerals, but with primed notation.

In Fig. 4, we show in more elaborate detail certain features of the alarm, counter, and display elements (and associated stepping-relay means) for one side of the track, as for example, the circuits associated with the stepping-relay means 65 covering the side of the track on which the rail 12 is mounted. For simplicity, certain of the elements shown in Fig. 3 and appearing in Fig. 4 have been given the same reference numerals insofar as the important parts of their function are identifiable by components in Fig. 4.

The stepping-relay means of Fig. 3 is shown in Fig. 4 to comprise a succession of relays 80—81—82, connected in cascade. The relays 80—81—82 may be provided in any desired plurality depending upon the maximum anticipated number of possible hot boxes for any given train. The relay 80 may be viewed as typical and as comprising two contact arms 83—84, ganged by means 85. For the deenergized position shown, the upper arm establishes a continuous B-plus supply to thyratron 55, by way of the coil of relay 80. Thus, immediately upon firing of the thyratron 55, relay 80 is actuated so that the contact arms 83—84 swing to the upper positions, at which time a hold-in circuit to B-minus is effective through the upper contact arm 83.

Having actuated the relay 80 and having held the same in by means of the upper contact for arm 83, the lower arm 84 is also in the upper position. The B-plus supply circuit for the thyratron 55 is thus completed by way of the lower contact for the upper arm 86 of the next relay 81, and the system is conditioned for reception of another signal representing the exceeding of threshold for that side of the system which represents response to the side of the track on which the rail 12 is located.

Should a second hot-box signal (exceeding threshold) be developed on said side of the track for the same train, another thyratron-fired impulse will be developed by way of the thyratron 55 to energize the relay 81, raising the upper contact 86 to the position in which it is continuously energized for hold-in purposes, and the lower contact 87 to the position of directly connecting B-plus voltage to the thyratron 55 by way of the upper contact of the next successive relay 82. The system is then conditioned for detection of the third possible hot box (exceeding threshold) on the same side of the track.

The nature and actuation of the relay 82 is in all respects the same as for the two preceding relays 80—81, and it suffices to say that, having actuated the relay 82, the B-plus supply circuit to the thyratron 55 is then transferred by way of the lower contact arm 88 of relay 82 to the coil circuit of a "trouble" relay 89. The relay 89 has been designated a "trouble" relay because it may be utilized to indicate that all possible sequencing positions of stepping relay means 80—81—82 have been loaded for one side of a particular train. Assuming that sufficient relays 80—81—82 have been provided to accommodate the worst possible conditions, then, having actuated all of the relays 80—81—82 for a particular train, the further actuation of relay 89 will mean probable trouble with the equipment.

Upon actuation of the "trouble" relay 89, the upper contact arm 89' thereof is drawn to the hold-in position, and the lower contact arm 89" is raised from its normally closed position to break the circuit from the negative B-supply terminal to the negative side of all hold-in circuits for the relays 80—81—82. Breaking contact at 89' will be effective to drop out and thus recondition all the alarm relays 80—81—82.

To complete the description of the circuit, we show provision at 90' of manual reset means whereby the positive side of the B-supply to all the various relays may be interrupted, thus allowing the relays to drop out and recondition themselves. Alternatively, automatic reset may be provided by a delay-timing mechanism 91', functioning in response to storage circuit 30 to actuate an automatic-reset relay 91", after the lapse of a pre-selected delay interval (e.g., one or two minutes) following closure of shutter 24, meaning after complete passage of the train. Simultaneous automatic reset for the stepping-relay means 66 (covering hot-box alarms and indications for the other side of the track) may be performed by further normally closed contacts (not shown) in the B'-supply circuit to relay means 66, as suggested by legend in Fig. 4.

In Fig. 4, the various alarm circuits 67—70—75 are shown to comprise separate lamps operating from third (normally open) contact arms ganged to relays 80—81—82 respectively, a "trouble"-indicating lamp functioning similarly at 98 upon excitation of the "trouble" relay 89. In like manner, the counter-display circuits 68—69, 71—72, 76—77 and 99 operate from fourth (double throw) contact arms ganged to the relays 80—81—82—89, the arrangement being such that axle counts and displays commence as each relay 80—81, etc. is picked up, said counts continuing with successive trip pulses received from pick-up C. Upon drop-out of relays 80—81—82—89, all displayed counts are cancelled and reset to zero, as the counter contact arms strike their lower or reset contacts, as will be understood.

In Fig. 5, we illustrate a typical sequence of operations occurring when a freight train nears a section of track monitored by our hot-box detecting equipment. Curves $a$ and $b$ illustrate the outputs of the detectors 10—11 (appearing in lines 27—28) covering the "left" and the "right" side of the track, respectively, it being understood that the passage of the first locomotive wheel at the location of the first pick-up unit A is effective to actuate the shutter and expose both detector cells to any and all successive passing heat sources. In the case illustrated, the locomotive has five axles, so that the first five pulses noted on each of the curves $a$ and $b$ denote passage of the locomotive.

The first freight car truck 33 is detected by means of the coincidence circuit 31 responding simultaneously to wheel-trip pulses from pick-ups A and B, as noted above. Upon detection of this first truck, the enabling circuit 36 functions to condition the gate 26 for operation on successive signals developed by the respective pick-up units. This operation of the enabling circuit is illustrated at curve $c$ of Fig. 5, and the individual gate operations following operation of the enabling circuit are illustrated at curve $d$.

Thus, for the first freight car truck 33 after the locomotive has passed, separate gates 90—91 will be defined by passage of each wheel 29'—34' over the distance D, between the pick-ups B and C. These gates will "straddle" or "bracket" the times of heat-signal development due to monitoring journal-box temperatures on axes 21—21'. The heat-signal pulse for the "left" detector unit 11 on the first wheel 29' of the truck 33 is denoted on curve $a$ at 92, and the second such pulse due to the second wheel 34' on the "left" side is similarly denoted at 93; corresponding pulses 92'—93' are indicated on curve b for the "right" side of the passing truck, it being noted that all pulses 92—93—92'—93' occur within the gated intervals 90—91, respectively.

Now, it can happen that, because of the axle-end play and other clearances necessarily provided in the freight-car trucks and other parts of passing rolling stock, the axle or axles for any particular truck are not always perfectly perpendicularly aligned with respect to the gage line of the track. This will mean that, for example, in the case of a slightly misaligned truck axle, the pulse 92 may be slightly time-displaced from the pulse 92', and the same may also be true for the pulse 93 with respect to the pulse 93'. This fact is illustrated in somewhat exaggerated detail on the expanded scale of curve e, wherein the pulses 93—93' are shown to be far from coincident, and yet they both occur within the gate interval 91.

In spite of the fact that the pulses 93—93' are not coincident, it will be appreciated the function of the storage circuits 41—43 (and simultaneous read-out of the same) is such for any particular gate interval (e.g., the gate interval 91), that charges representing the magnitude of pulse 93 and the magnitude of pulse 93' will be available for simultaneous read-out on the two storage capacitors 41—43. Thus, true differential comparison of the instantaneous magnitude of pulses 93—93' is achieved, and the particular thyratron and associated alarm, counter, and display circuits are properly actuated regardless of the alignment or misalignment condition of particular passing axles. The pulses shown on curves a and b all happen to be shown as of substantially uniform height, meaning all axles are equipped with same type (plain or roller) bearing and that no abnormal temperatures are observed. The thyratrons 55 or 56 will be fired only if (on read-out of the storage means 41—43) one of the "left" pulses is found to exceed (or be exceeded by) the corresponding "right" pulse, to the extent of the threshold determined by the cathode-connection settings at the B-supply voltage dividers 61—62.

Subsequent wheel trucks, following the truck 33 which produced the pulses 92—93—92'—93', may or may not be representative of misalignment conditions, but whether these trucks are or are not aligned, true differential read-out and threshold evaluation of signal magnitudes are possible so that the alarm system may function without ambiguity. The trailing truck for the first freight car will be seen to produce pulses identifying journal-box heat signals at 94—95, and the first and second trucks of the next freight car account for the succeeding pulses 96—96' and 97—97' respectively.

Since the operation of the gating storage, alarm and counting circuits is exactly the same as that which has already been described, there is no need to go further into the details of circuit functioning for pulse development at 96—97 or for that matter to the end of the train. It suffices to say that, should the threshold magnitude be exceeded for either monitored side of the train, a first appropriatae alarm circuit on that side will be actuated and counting begun, so that, by the time the whole train has passed the monitoring point, there will be a complete axle-count development to the troublesome location. At the same time, it will also be noted that, once having set off a particular alarm and counter circuit, the system will have conditioned itself for tripping the next alarm (and associated counter circuit) on that side of the train. This indexing of alarm circuits, and the individual counting of axles to each particular troublesome location, will continue until the entire capacity of the system has been achieved, after which time the detection of another hot box exceeding threshold will actuate the "trouble" circuit, to produce a "trouble" indication. The alarm and counter circuits for each side of the train are provided in such plurality as to anticipate the worst conditions on a particular train, and, of course, should the capacity of the system be exceeded for any one train, the "trouble" indication will be a fairly accurate indication of system trouble, because more than the anticipated worst condition will have developed, thus suggesting that the equipment is out of order, requiring, for example, readjustment of the threshold circuits.

It has been previously stated that the same type of bearings are used at the opposite ends of an axle. It is also true that all the axles on a given car ride in the same type bearings. Thus, in accordance with another aspect of the invention pairs of journal boxes or wheel-axle junctions on the same side of the truck are differentially evaluated. Since on American railroad cars only an even number of axles are used, the journal boxes or axles on each side of a truck may be compared in pairs without carrying over from one car to the next.

Referring now to Fig. 6, the circuit for comparing the incident radiation from pairs of journal boxes or axles on the same side of a car comprises the heat detectors 10, 11, amplifiers 18 and gating circuits 26' (using the same reference numerals for the same and corresponding parts previously referred to in Fig. 3).

Two channels are utilized in this embodiment for detecting the heat conditions of equipment on the opposite sides of the train respectively. Since the two channels are alike, only one will be described.

As in the earlier embodiment (Fig. 3) the detected incident radiation is converted into electrical signals at 10, amplified at 18, gated and applied to the differential evaluating and read out circuits 100 over commutator means 101. The circuits 100 correspond to the several circuits shown in Fig. 3 between the gate 26 and the alarm circuits 67—67'. The alarm circuits shown by block diagrams at 102 and 103 in Fig. 6 correspond to the alarm circuits 67 to 77, and 67' to 77', respectively, shown in Fig. 3.

The Fig. 6 embodiment of the invention is characterized by successively applying the video signals, representing the incident radiation from successive boxes or axles on one side of a truck, to alternate inputs (e.g., 46, 47, Fig. 3) of the comparison circuits 100. This operation is accomplished by a commutator 101 which is shown as a magnetically driven stepping switch. The switch, as shown, comprises two banks, A' and B'; bank A' applying the signals to the comparison circuit and bank B' completing the read-out circuit to ground.

It will be recalled in Fig. 3 that read-out occurred immediately after a pair of signals (representing radiation from the opposite boxes of an axle) were applied to a storage circuit. In the Fig. 6 embodiment, a similar operation takes place. For example, the stepping switch is in a position to apply the signals from the gate to a first input of the storage circuit; let us say the signal represents radiation from a box on a first axle. The signal is applied to the comparison circuit over line 46. Since bank B' is "opened" no read-out takes place and the first signal is stored. At the completion of reading in the signal, wheel trip C is operated and the stepping switch is actuated. The next input signal is applied over line 47, and the read-out circuit is now prepared for operation. Upon wheel trip C becoming operated by the following wheel, the contact 51 (Fig. 3) is closed, and a difference signal is read out as described in detail above.

As in the earlier embodiment, the alarm circuits 102, 103 may distinguish the polarity of observed differentials exceeding threshold; in Fig. 6, this means discrimination between "odd" and "even" numbered axles for, say, the "Right" side of the train. This is a result of all odd number axles being consistently applied over one of the lines 46 or 47, and the even number axles being applied over the other. Similar discrimination, alarm, and display for odd and even axle ends observed on the other side of the train are automatically handled by the circuits 100', 102', and 103', as will be understood.

It will be appreciated that throughout this description, the word "alarm" has been used broadly, to designate any warning system necessary or desirable for particular installation requirements. For example, in addition or alternatively to the lamp indicators described, the detected differential signals exceeding threshold may automatically operate conventional railway-signalling devices, such as stop or caution signals for alerting the locomotive engineer or for automatically stopping the train.

Throughout the specification, reference has been made to observing journal heat conditions by observing the journal boxes directly, but as set forth in Gallagher Patent 2,880,309, issued March 30, 1959, journal heat conditions may also be observed between rails by having the detector imaged in the vicinity of wheel-axle junctions. Since the present invention is concerned with the concept of differential comparison in combination with otherwise conventional hot-box detectors, it will be understood that viewing of wheel-axle junction areas or of journal boxes directly are equally compatible with the invention. Therefore, in the specification and claims, reference to viewing of journal boxes is to be taken in the broad sense as contemplating either type of viewing to develop heat signals.

The embodiment of Fig. 6 will be understood to be broadly illustrative of a method of deriving differential comparison of successive journal-heat signals. For example, these signals (to be differentially compared) need not be from the same side of the train. Thus, in an interlaced-video application, wherein detector locations are longitudinally staggered by substantially half a car-truck wheelbase, as disclosed in pending application Serial No. 695,352, filed November 8, 1957, the commutating principle employed at 101—100—102—103 may be utilized for differential evaluation of successive signals representing opposite ends of the same axle.

It will be seen that we have described an ingenious system for automatically monitoring the presence of troublesome hot-box conditions. The system is entirely automatic and requires no observation of graphs or human evaluation of relative magnitude of signals, although chart recordings may be made, if desired, as by a two-channel amplitude recorder 105 or by a single-channel recorder 106 responsive to differential evaluations upon read-out at each operation of relay 52.

In the case of the two-channel recorder 105, the separate recording styli trace separate journal-heat records, one for the right, the other for the left, side of the train; in the case of the single-channel recorder 106, the single recording stylus is normally placed in the central portion of the moving recorder paper, and stylus excursions to one or to the other side of the central position are indicative of the instantaneous direction (e.g. left journal or right journal, for a given axle) of journal-heat predominance, while the lateral extent of the excursion indicates the magnitude of the difference.

The system is independent of the type of bearing used on the particular passing rolling stock, except, of course, that the system proceeds on the assumption that the same type of bearing (e.g. plain bearings or roller bearings) will be used at both ends of any particular axle, or in the alternative embodiment, on all axles of a car. The system automatically further responds to discriminate against locomotives and passenger cars, and, of course, the principles of the invention are equally applicable (upon proper, but different, spacing of the wheelbase trips A—B) to discriminate for any other truck wheelbase, as, for example, to respond to certain passenger cars as distinguished from freight cars.

While we have described the invention in detail for the preferred forms illustrated, it will be understood that modifications may be made within the scope of the invention as defined in the claims which follow.

What is claimed is:

1. An overheated-journal warning device, comprising plural heat-responsive means mounted alongside opposite rails of a length of railroad track, each said heat-responsive means producing an electrical signal in response to incident radiation and including optical means separately imaging said respective heat-responsive means on passing railroad axles or axle boxes when so mounted, wheel-operated mechanism including gating means, determining a time interval within which both ends of a given axle will pass the respective images of said heat-responsive means, the outputs of both said heat-responsive means being fed to said gating means, whereby the output of said gating means may reflect only heat response during the gated interval, separate storage channels including separate connections to the respective gated outputs of said heat-responsive means, threshold-circuit means including a first threshold circuit connected to a pair of said storage channels and evaluating the difference between a pair of stored signals and producing an output for an evaluated difference exceeding a predetermined threshold, said threshold-circuit means further including a second threshold circuit, stepping-relay means in the first of said threshold circuits and effective to transfer connection of said storage channels from said first threshold circuit to said second threshold circuit, plural alarm circuits each being connected to a different one of the stepped outputs of said relay means, whereby for each overheated condition detected on a particular train a first alarm will indicate a first such condition and a second alarm will indicate a second such condition.

2. A device according to claim 1, in which an independent counter circuit is associated with each of said alarm circuits, whereby each counter circuit may be enabled as the alarm corresponding thereto is actuated, and means connecting said wheel-operated mechanism to all said counter circuits, whereby, upon the enabling of a particular counter, the latter will count passing wheels and therefore axles to the end of the train, so that an indication may be obtained as to the location of the overheated condition giving rise to the alarm.

3. An overheated-journal warning device, comprising plural heat-responsive means mounted alongside opposite rails of a length of railroad track, each said heat-responsive means producing an electrical signal in response to incident radiation and including optical means separately imaging said respective heat-responsive means on passing railroad axles or axle boxes when so mounted, wheel-operated mechanism including gating means determining a time interval within which both ends of a given axle will pass the respective images of said heat-responsive means, the outputs of both said heat responsive-means being fed to said gating means, whereby the output of said gating means may reflect only heat response during the gated interval, separate storage channels including separate connections to the respective gated outputs of said heat-responsive means, transient differential read-out means connected to two of said storage channels and connected for operation by said wheel-operated mechanism, said read-out means including means discharging said two storage channels upon differential read-out to thereby condition said two storage channels to accept electrical signals representing later-observed radiation, threshold-circuit means connected to said read-out means and producing an output for an evaluated read-out difference exceeding a predetermined threshold, and alarm means responsive to an output of said threshold-circuit means.

4. A device according to claim 3, in which said threshold-circuit means includes a first threshold circuit connected to both said channels and evaluating the extent to which stored signal in one channel exceeds that in the other channel, a second threshold circuit connected to both said channels and evaluating the extent to which a stored signal in said other channel exceeds that in said one channel, said alarm means comprising separate alarms for each of said threshold circuits.

5. A device according to claim 3, in which said threshold-circuit means includes a first threshold circuit connected to both said channels and evaluating the extent to which stored signal in one channel exceeds that in the other channel, a second threshold circuit connected to both said channels and evaluating the extent to which a stored signal in said other channel exceeds that in said one channel, and counter means connected to the output of one to the exclusion of the other of said threshold circuits, said counter means having a control connection to said wheel-operated means to count wheels and, therefore, axles subsequent to development of an output signal in said one threshold circuit.

6. An overheated-journal warning system, comprising an infrared detection device mounted alongside one of the rails of a length of railroad track, said detection device comprising heat-responsive means producing an electrical signal in response to incident radiant energy and including optical means imaging said heat-responsive means on passing railroad axles or axle boxes when so mounted, wheel-operated trip means mounted at the track and including gating means defining a time when said heat-responsive means is imaged on a railroad-car axle or axle box, commutating means including two output connections and having an input connected to said heat-responsive means and sequentially connecting said heat signals to one and then to the other of said output connections, said commutating means including a control connection to said wheel-operated trip means, and comparator means including separate input connections to the respective output connections of said commutating means, one of said comparator input connections including a storage means, said comparator means including means for differentially evaluating the magnitude of a first such heat-signal via said storage means in comparison with a second such heat signal, and threshold means effective upon detection of at least a threshold difference in response to said first and second heat signals.

7. A hot-box detecting device comprising plural heat-responsive means, each producing an electrical signal in response to incident radiant energy and adapted to be fixedly mounted alongside opposite sides of a length of railroad track, optical means imaging said respective heat-responsive means on passing railroad journal boxes when so mounted, whereby separate transient electrical pulse signals are developed by said heat-responsive means for journal boxes at each end of each axle, means coupled to the outputs of said heat-responsive means for transiently differentially evaluating the outputs of said heat-responsive means for pairs of passing journal boxes, the transient differential-evaluation operation of said last-defined means being shorter in time than the fastest anticipated time lapse between adjacent axles of a train past the location of said device, whereby successive transient differential evaluations may be performed by said last-defined means for successive pairs of passing journal boxes, and means effective upon detection of a threshold difference in the transiently evaluated outputs of said heat-responsive means for operating an alarm circuit.

8. The device according to claim 7, wherein said pairs of passing journal boxes comprise the boxes on opposite ends of the same axle.

9. The device according to claim 7, wherein said pairs of passing journal boxes comprise adjacent boxes passing on the same side of the length of track.

10. The device according to claim 8, and further comprising wheel operated gating means for passing the outputs of said heat-responsive means to said differential evaluating means substantially only while said heat-responsive means is imaged on said passing journal boxes.

11. The device according to claim 9, and further comprising wheel-operated gating means for passing the outputs of said heat-responsive means to said differential evaluating means substantially only while said heat-responsive means is imaged on said passing journal boxes, said differential evaluating means including a wheel-operated commutator sequentially channeling successive heat signals into separate channels for differential comparison.

12. The device according to claim 7, in which said differential evaluating means includes storage means for separately storing the heat signal for one journal box and the heat signal for another journal box, and read-out means synchronized with wheel passage for determining the instant at which said stored signals are differentially evaluated.

13. An overheated-journal warning device, comprising plural heat-responsive means adapted to be mounted alongside opposite rails of a length of railroad track, each said heat-responsive means producing an electrical signal in response to incident radiant energy and including optical means imaging said respective heat-responsive means on axially opposite corresponding parts of passing railroad axles or axle boxes when so mounted, whereby separate transient electrical pulse signals are developed by said heat-responsive means for journal boxes at each end of each axle, wheel-operated means including gating mechanism determining a time interval within which both ends of a given axle will pass the respective images of said heat-responsive means, the outputs of both said heat-responsive means being fed to said gating mechanism, whereby the output of said gating mechanism may reflect only the successive transient heat-responses during successive gated intervals, and differentially responsive means responsively connected to the respective gated outputs of said heat-responsive means during each gated interval, the differential-evaluation operation of said last-defined means being shorter in time than the fastest anticipated time lapse between adjacent axles of a train past the location of said device, whereby successive transient differential evaluations may be performed by said last-defined means for successive pairs of passing journal boxes.

14. A hot-box detecting device, comprising plural heat-responsive means adapted to be fixedly mounted alongside a length of railroad track on opposite sides thereof, each said heat-responsive means producing an electrical signal in response to incident radiation and including optical means imaging said respective heat-responsive means on passing railroad axles or axle boxes when so mounted, wheel-operated gating mechanism determining a time interval within which both axle boxes on a given axle will pass the respective images of said heat-responsive means, the outputs of both heat-responsive means being fed to said gating mechanism, whereby the transient electrical signals reflecting heat observations for the respective ends of a first axle are applied via said gating mechanism during a first gate interval and those for successive axles are applied during succeeding gate intervals, separate storage circuits connected and responsive respectively to the outputs of said heat-responsive means during each gated interval, means for sampling the relative stored energy in each of said storage circuits for each pair of passing axle boxes, said last-defined means comprising wheel-operated read-out means effective upon each read-out to discharge the stored information in each of said storage circuits, whereby said storage circuits are automatically reconditioned immediately upon read-out for each pair of axle boxes, thereby conditioning the same to accept a storage of information for the gated interval corresponding to the next succeeding pair of axle boxes.

15. A hot-box detecting device, comprising plural heat-responsive means adapted to be fixedly mounted alongside a length of railroad track on opposite sides thereof, each said heat-responsive means producing an electrical signal in response to incident radiation and including optical means imaging said respective heat-responsive means on passing railroad axles or axle boxes when so mounted, wheel-operated gating mechanism determining a time interval within which both axle boxes on a given axle will pass the respective images of said heat-responsive means, the outputs of both heat-responsive means being fed to said gating mechanism, whereby the transient electrical signals reflecting heat observations for the respective ends of a first axle are applied via said gating mechanism during a first gate interval and those for successive axles are applied during succeeding gate intervals, separate storage-circuit channels responsive to the outputs of said respective heat-responsive means during gated intervals, first means connected to said channels and differentially evaluating the extent to which the stored signal in one of said channels exceeds that in the other, and second means connected to said channels and differentially evaluating the extent to which the stored signal in the other of said channels exceeds that in said one channel.

16. An overheated journal warning device, comprising plural heat-responsive means mounted alongside opposite rails of a length of railroad track, each said heat-responsive means producing an electrical signal in response to incident radiant energy and including optical means imaging said respective heat-responsive means on passing journal boxes of railroad cars when so mounted, wheel-operated gating mechanism gating the outputs of said heat-responsive means to intervals substantially coextensive with the imaged viewing of said journal boxes by said heat-responsive means, two wheel-responsive trips adapted to be fixedly mounted in longitudinally spaced relation along the track to the same extent as the wheelbase of a railroad car truck to be monitored, gage-enabling means connected to said gating mechanism and responsive to time coincidence in outputs of said trips for enabling said gating mechanism upon first detection of said coincidence in a given train, and means connected to said respective heat responsive means and differentially evaluating the gated outputs of said heat-responsive means.

17. An overheated journal warning device, comprising plural heat-responsive means mounted alongside opposite rails of a length of railroad track, each said heat responsive means producing an electrical signal in response to incident radiant energy and including optical means for imaging said respective heat-responsive means on railroad car axles or axle boxes when so mounted, wheel-operated gating mechanism gating the outputs of said heat-responsive means to intervals substantially coextensive with the imaged viewing of said axles or axle boxes by said heat-responsive means, two wheel-responsive trips adapted to be mounted in longitudinally spaced relation along the track to the same extent as the wheelbase of a truck size to be monitored, gate-enabling means connected to said gating mechanism and responsive to time-coincidence in outputs of said trips for enabling said gating mechanism upon first detection of said coincidence in a given train, and means differentially evaluating the outputs of said heat-responsive means.

18. An overheated journal warning device, comprising plural heat-responsive means mounted alongside opposite rails of a length of railroad track, each heat responsive means producing an electrical signal in response to incident radiant energy and including optical means imaging said respective heat-responsive means on railroad car axles or axle boxes as distinguished from the axial ends thereof when so mounted, wheel-operated gating mechanism gating the outputs of said heat-responsive means to intervals substantially coextensive with the imaged viewing of said axles or axle boxes by said heat-responsive means, two wheel-responsive trips adapted to be fixedly mounted in longitudinally spaced relation along the track to the same extent as the wheelbase of a truck size to be monitored, gate-enabling means connected to said gating mechanism and responsive to time-coincidence in outputs of said trips for enabling said gating mechanism upon first detection of said coincidence in a given train, and a threshold device differentially responsive to the outputs of said heat-responsive means.

19. The method of determining excessive journal-box infrared-radiation conditions for a moving railroad car with an axle having two spaced journal boxes, comprising the steps of applying at one fixed trackside location a radiation image of one journal box to one infrared detector, applying at a corresponding but opposite fixed trackside location a radiation image of the other journal box to another infrared detector, transiently differentially utilizing the signals generated by said detectors for indicating that the infrared radiation from one of the journal boxes is excessive, and repeating said steps for the journal boxes of succeeding axles.

20. The method of determining excessive journal-box infrared-radiation conditions for a moving railroad car with an axle having two spaced journal boxes, comprising the steps of applying at one fixed trackside location a radiation image of one journal box to one infrared detector, applying at a corresponding but opposite fixed trackside location a radiation image of the other journal box to another infrared detector, transiently utilizing a first polarized difference in magnitude of said signals generated by said detectors for indicating whether the infrared radiation from one of the journal boxes is excessive, transiently utilizing a second polarized difference in magnitude of said signals generated by said detectors for indicating whether the infrared radiation from the other of the journal boxes is excessive, and repeating said steps for the journal boxes of succeeding axles.

21. The method of determining excessive journal-box infrared-radiation conditions for a moving railroad car having on one side thereof two spaced journal boxes, comprising the steps of applying at a fixed trackside location a radiation image of the first journal box to an infrared detector, applying a radiation image of the second journal box to the infrared detector, transiently differentially utilizing the signals generated by said detector for indicating that the infrared radiation from one of the journal boxes is excessive, and repeating said steps for the succeeding journal boxes on said one side of the car.

22. A hot-box detecting device comprising plural heat-responsive means, each producing an electrical signal in response to incident radiant energy and adapted to be fixedly mounted alongside opposite sides of a length of railroad track, optical means imaging said respective heat-responsive means on passing railroad journal boxes when so mounted, and a single-channel differential recorder having a first connection to the heat-responsive means on one side of the track and a second connection to the heat-responsive means on the other side of the track, said connection being connected to differentially record the instantaneous differential evaluation of two such electrical signals representing observed journal-heat on two different journal boxes whereby the extent and direction of recorder excursions with respect to a median position will indicate in a single trace the extent to which the journal heat at a particular end of each passing axle predominates over the journal heat at the opposite axle end.

References Cited in the file of this patent

UNITED STATES PATENTS

| | | |
|---|---|---|
| 1,971,317 | Sheldon et al. | Aug. 21, 1934 |
| 2,385,487 | Baughman | Sept. 25, 1945 |
| 2,415,566 | Rhea | Feb. 11, 1947 |
| 2,420,968 | Newell | May 20, 1947 |
| 2,422,334 | Bedford | June 17, 1947 |
| 2,436,341 | Weybrew | Feb. 17, 1948 |
| 2,568,538 | Brailsford et al. | Sept. 18, 1951 |

(Other references on following page)

UNITED STATES PATENTS

| | | |
|---|---|---|
| 2,659,082 | Pearson | Nov. 10, 1953 |
| 2,806,149 | Lillquist | Sept. 10, 1957 |
| 2,818,508 | Johanson et al. | Dec. 31, 1957 |
| 2,856,539 | Orthuber et al. | Oct. 14, 1958 |
| 2,856,540 | Warshaw | Oct. 14, 1958 |
| 2,880,309 | Gallagher et al. | Mar. 31, 1959 |
| 2,881,255 | Hall | Apr. 7, 1959 |
| 2,897,485 | Johnson | July 28, 1959 |
| 2,906,885 | Orthuber et al. | Sept. 29, 1959 |

FOREIGN PATENTS

| | | |
|---|---|---|
| 401,667 | Germany | Sept. 8, 1924 |

OTHER REFERENCES

S.H.A., German application 1,002,381, printed February 14, 1957 (Kl. 20*h* 1), 2 pages spec., 1 sheet drawing.

S.H.A., German application 1,031,338, printed June 4, 1958 (filed March 22, 1957) (Kl. 20*h* 1), 2 pages spec., 1 sheet of drawing.

UNITED STATES PATENT OFFICE
CERTIFICATION OF CORRECTION

Patent No. 2,963,575 December 6, 1960

William M. Pelino et al.

It is hereby certified that error appears in the above numbered patent requiring correction and that the said Letters Patent should read as corrected below.

Column 12, line 8, after "means" strike out the comma.

Signed and sealed this 23rd day of May 1961.

(SEAL)
Attest:

ERNEST W. SWIDER
Attesting Officer

DAVID L. LADD
Commissioner of Patents